(No Model.)
C. C. & S. B. PARKER.
Spring-Scale.
No. 227,645.  Patented May 18. 1880.
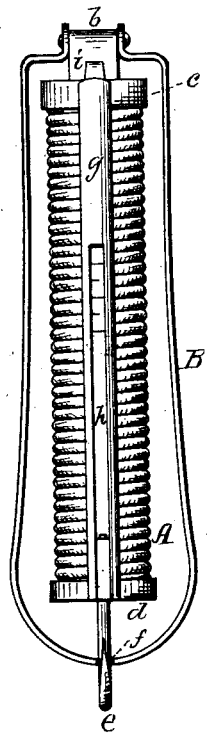
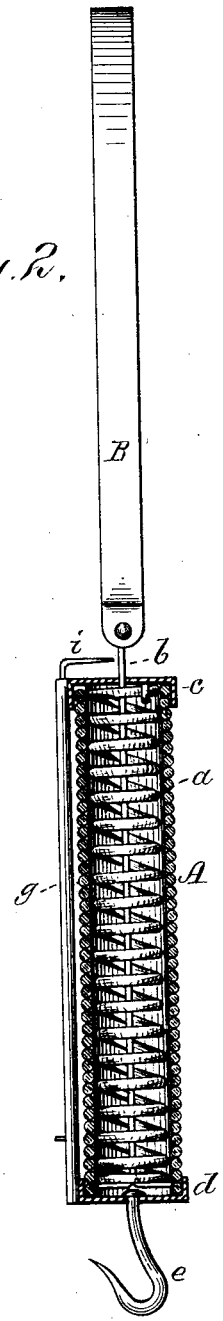
Witnesses
Nat. E. Oliphant
Geo. R. Porter
Inventors
Chauncey C. Parker.
Simon B. Parker.
per Chas. H. Fowler,
Attorney.

UNITED STATES PATENT OFFICE.

CHAUNCEY C. PARKER AND SIMON B. PARKER, OF BROOKLYN, NEW YORK.

SPRING-SCALE.

SPECIFICATION forming part of Letters Patent No. 227,645, dated May 18, 1880.

Application filed April 7, 1880. (No model.)

*To all whom it may concern:*

Be it known that we, CHAUNCEY C. PARKER and SIMON B. PARKER, citizens of the United States, residing at Brooklyn, in the county of Kings and State of New York, have invented certain new and useful Improvements in Spring-Scales; and we do hereby declare that the following is a full, clear, and exact description of the same, reference being had to the annexed drawings, making a part of this specification, and to the letters and figures of reference marked thereon.

Figure 1 of the drawings is a front elevation of the scales with the pivoted bail in a closed position, and Fig. 2 is an elevation of the same with the cylindrical casing in section and the bail open for use.

This invention has relation to certain new and useful improvements in spring scales or balances, whereby a more durable article is obtained, more compact and less expensive in its construction, as well as possessing means whereby the weight of an object is determined after being removed from the scales, as will be hereinafter described, and subsequently pointed out in the claims.

In the accompanying drawings, A represents the cylindrical casing for containing the spiral spring $a$ and bar $b$, the latter having graduations upon its face. The casing A is composed of a continuous coil of wire, the coils of which are compressed together and secured by solder. This forms not only a very neat appearance for the casing, but admits of it being manufactured at a greatly reduced cost over the casings constructed of sheet metal.

A very important advantage in the coiled-wire casing is the strength it possesses, it being almost impossible to dent or otherwise injure it by careless handling.

To the ends of the spiral or coiled wire casing A are secured, by solder or other means, caps $c$ $d$, the lower cap, $d$, having secured to it a hook, $e$, to which the object to be weighed is suspended.

The index-bar $b$, around which the coiled or spiral spring $a$ passes, is slit at its lower end and bent outward in opposite directions to form a bearing for the lower end of the spring, the opposite or upper end of the same being suitably connected to the cap $c$ to prevent said spring from turning.

The index-bar $b$ passes through an opening in the cap $c$, and has pivoted to it a metal bail, B, of the required width and length, so that it will close down and around the casing A, as shown in Fig. 1, when the scales are not in use.

The bail B has a niche, $f$, to form a seat for the end of the hook $e$ to protect it.

In closing the bail it is first turned down over the casing A and pressed up a sufficient distance to admit the free end thereof passing under the point of the hook $e$, after which the spiral spring $a$ retains it in position against the point to protect the hook from injury.

The casing A has secured to it guide-plate $g$ to receive a slide, $h$, having upon its upper end a pointer, $i$, said slide being graduated and numbered to correspond with the graduations and numbers on the bar $b$. This slide $h$, with its pointer $i$, we term an "indicator."

The weight of the pail or other vessel being indicated by moving the slide to the upper mark on the bar $b$, after which the articles to be weighed are placed in the vessel, the difference in the graduations on the bar and slide would be the weight of the articles.

If desired, the weight of the articles may be obtained from the graduations on the indicator alone, as found desirable.

Having now fully described our invention, what we claim as new, and desire to secure by Letters Patent, is—

1. A spring-scale having its outer casing formed from a continuous coil of wire, the coils being compressed together and secured by soldering, substantially as and for the purpose set forth.

2. The casing A, index-bar $b$, and spring $a$, in combination with the indicator consisting of the slide $h$ and pointer $i$, substantially as and for the purpose specified.

3. A spring-scale consisting of the casing A, bar $b$, spring $a$, and the slide $h$, with pointer $i$, said bar $b$ having pivoted to it the bail B, substantially as and for the purpose described.

In testimony that we claim the above we have hereunto subscribed our names in the presence of two witnesses.

CHAUNCEY C. PARKER.
SIMON B. PARKER.

Witnesses:
J. B. DAVENPORT,
L. O. JENKINS.